No. 877,629.
PATENTED JAN. 28, 1908.
H. A. BROWN.
PNEUMATIC WHEEL AND HUB.
APPLICATION FILED NOV. 1, 1906.
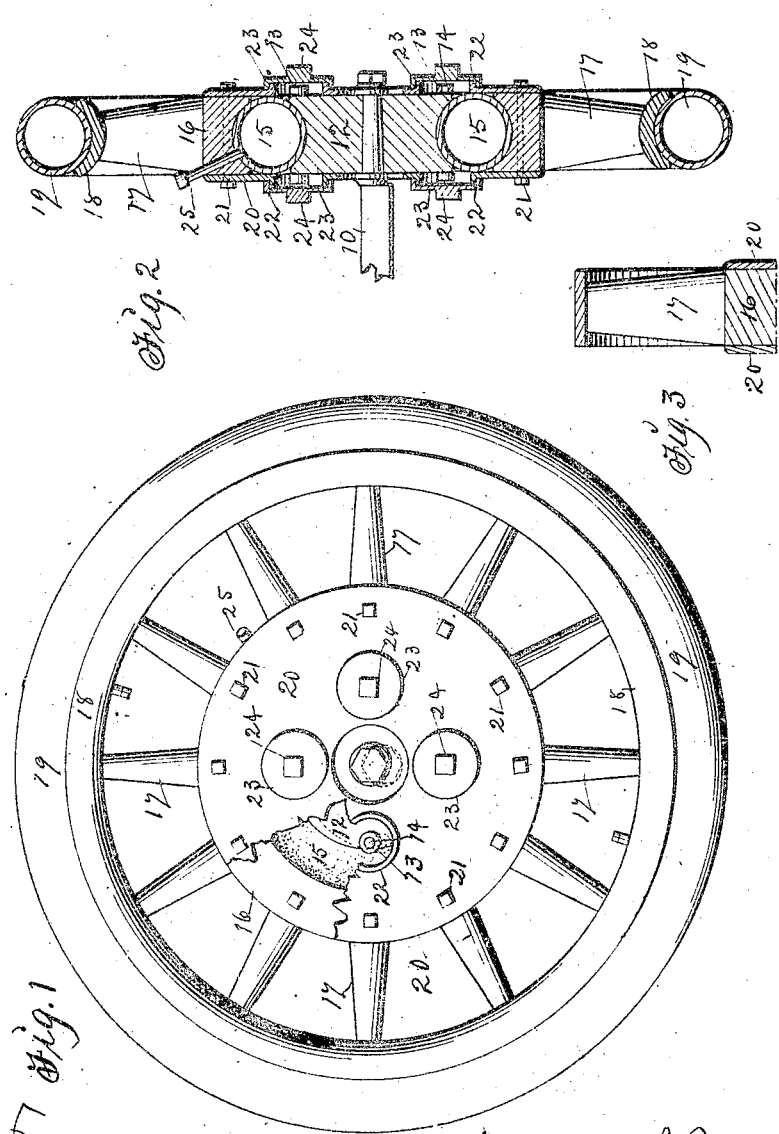

UNITED STATES PATENT OFFICE.

HAMILTON A. BROWN, OF LEHIGH, IOWA.

PNEUMATIC WHEEL AND HUB.

No. 877,829.

Specification of Letters Patent.

Patented Jan. 28, 1908.

Application filed November 1, 1906. Serial No. 342,150.

*To all whom it may concern:*

Be it known that HAMILTON A. BROWN, a citizen of the United States, residing at Lehigh, in the county of Webster and State of Iowa, have invented a new and useful Pneumatic Wheel and Hub, of which the following is a specification.

My object is to provide a simple, strong and durable wheel specially adapted for automobiles, and other vehicles, to prevent the jarring and concussion incident to the use of carriages on rough roads.

My invention consists in the construction, arrangement and combination of elements and sub-combinations as hereinafter set forth, pointed out in my claims and illustrated in the accompanying drawings, in which—

Figure 1 is a side view of the wheel from which part of an outer plate is broken away to disclose two distinct and concentric parts of a hub and a pneumatic circular tube between them. Dotted lines indicate the motion of the inner and smaller part of the hub and the circumference of the wheel when the wheel is subjected to pressure and rotated on the axle. Fig. 2 is a vertical central sectional view that shows the positions of all the parts relative to each other and the axle upon which the wheel is mounted. Fig. 3 is a detail view that shows an elastic metal rim on the ends of the spokes in place of a pneumatic tube as shown in Fig. 2.

The numeral 10 designates an axle and 12 the inner part of the hub on the axle. It has a concave groove in its periphery and anti-friction rollers 13 on bearers 14 fixed in its sides near its circumference and a pneumatic tube 15 in the concave groove in the exterior of the inner part 12. A rigid circular frame 16 is fitted on the tube 15. Spokes 17 are fixed on the frame 16 and a rim 18 on the ends of the spokes for retaining a pneumatic tube 19 as shown in Fig. 2, or in any suitable way.

To the outside faces of the hub portion, 16, are fixed circular plates 20, by means of bolts 21, and the two plates have coinciding circular openings and screw threaded flanges 22 extending outwards and adapted to receive screw-threaded caps 23 for closing the openings. The caps have angular projections 24 for applying a wrench thereto as required for placing them on and taking them off.

By means of the solid hub 12 on the axle 10 and the rollers 13 on their side faces and the circular solid frame 16, the plates 20, having circular openings and flanges 22, are fixed together and the caps 23 are detachably placed on the flanges to reinforce the plates and to allow access to the rollers as required to facilitate repairing or replacing the rollers.

A tube 25 is connected with the outer hub portion 16 and the tube 15 as required for inflating the tube.

In the practical use of my invention when the wheel is advanced on the ground and under pressure at every quarter revolution the flanges 22 will engage the anti-friction rollers 13 and the greater part of the weight on the wheel will be distributed to the pneumatic tube 15 between the two parts of the hub 12 and 19 as required to relieve and protect to a great extent the outer tube 19 and to prevent jarring and concussion.

Having thus set forth the purposes of my invention and the construction, arrangement and combination of all the parts the practical operation and utility thereof will be obvious.

What I claim as new and desire to secure by Letters-Patent, is:—

1. In an elastic wheel, a solid hub having a continuous concave groove in its periphery and anti-friction rollers on its side faces, a solid circular frame having a continuous concave groove in its inner face, a pneumatic tube between the hub and the circular frame and the hub and the frame connected by circular plates fixed to the side faces of the circular frame and provided with openings for the purpose stated.

2. In an elastic wheel, a solid hub having anti-friction rollers on its side faces, a circular frame, a pneumatic tube between the hub and the frame, circular plates fixed to the side faces of the frame, circular flanged openings in the plates and caps detachably fixed on the flanges, to operate as set forth.

3. In an elastic wheel, a hub composed of an inner part having a continuous concave groove in its periphery, a plurality of anti-friction rollers at its side faces, a concentric outer part of a hub having a continuous concentric groove in its inner circumference, a pneumatic tube between the parts of the hub, circular plates fixed to the side faces of the outer part of the hub, circular openings in said plates, flanges projecting outward from said openings and caps fitted to the flanges as set forth.

4. A pneumatic wheel comprising an inner part of a hub and an outer part of a hub, a pneumatic tube between the two parts, plates fixed to the sides of the outer part of the hub to extend over the sides of the inner part of the hub, spokes extending from the outer part of the hub, a rim on the ends of the spokes, circular openings in the plates provided with flanges, caps on the flanges and anti-friction rollers on the side faces of the inner part of the hub to engage said flanges, arranged and combined to operate as set forth.

HAMILTON A. BROWN.

Witnesses:
B. O. Du Bois,
Hal C. Fuller.